March 3, 1953
G. E. BATCHELDER
2,630,101
FLUID METER
Filed June 27, 1947
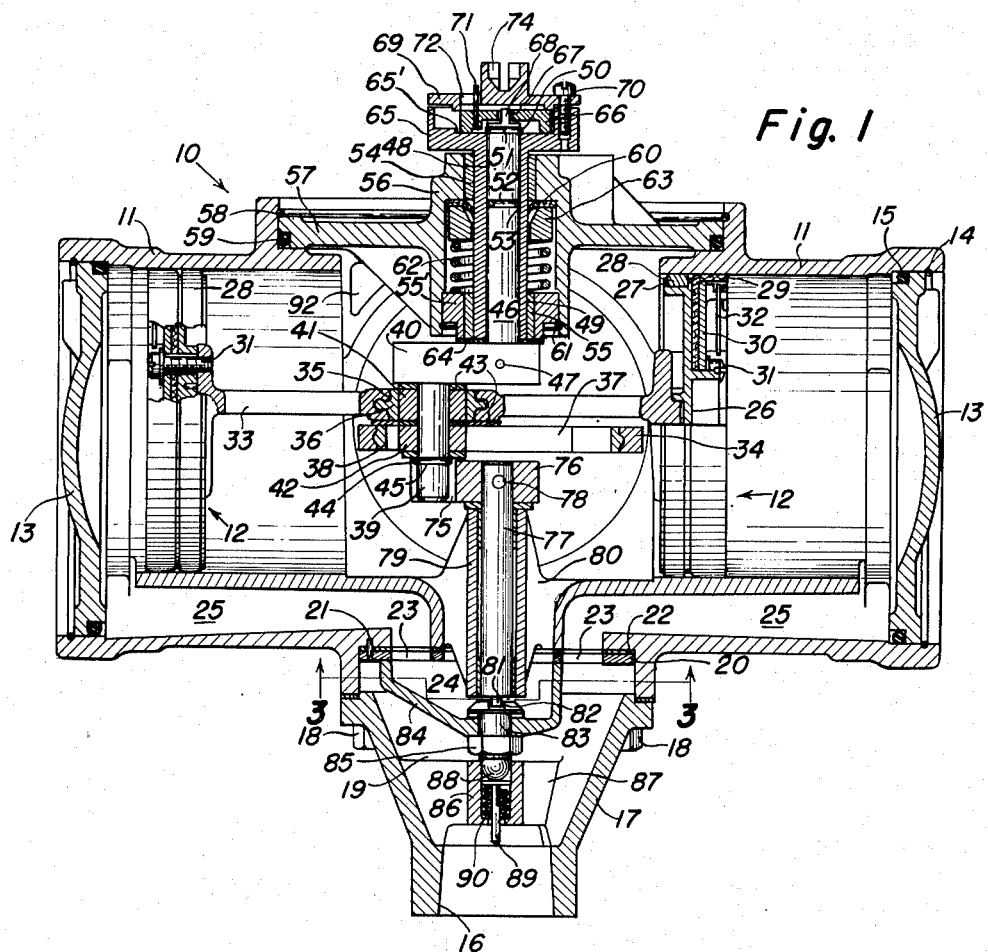
Fig. 1
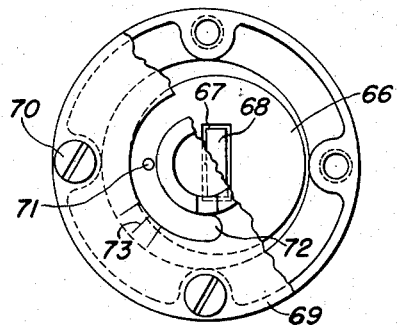
Fig. 2
Fig. 3
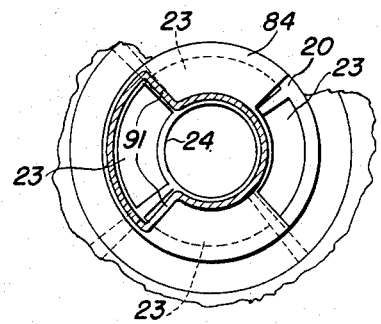
INVENTOR.
George E. Batchelder
BY
*Strauch + Hoffman*
Attorneys Patented Mar. 3, 1953

2,630,101

UNITED STATES PATENT OFFICE 2,630,101

FLUID METER

George E. Batchelder, Pittsburgh, Pa., assignor to Rockwell Manufacturing Company, Pittsburgh, Pa., a corporation of Pennsylvania Application June 27, 1947, Serial No. 757,479

4 Claims. (Cl. 121—121)

This invention relates to fluid meters of the positive displacement type, and particularly to meters of the type known as piston meters.

In fluid meters of this type, the measurement of fluid is accomplished by displacing a plurality of pistons located in suitable cylinders and the movement of the pistons is transmitted through suitable mechanism to a register. A valve which is timed in relation to the movement of the pistons, alternatingly admits and discharges fluid to and from the cylinders in proper sequence.

In meters of the piston type, inaccuracies of fluid measurement due to manufacturing inequalities, excessive wear or maladjustment are frequently found. Various methods of compensating for these inaccuracies have been suggested, and Parker et al. Patent No. 2,106,651 discloses a piston meter in which errors are compensated by varying the length of the stroke of the pistons and thus changing the displaceable volume at the cylinders.

I have found that the length of stroke of the pistons can be easily and effectively varied by changing the effective length of the crank arm which the pistons operate. This mechanism for varying the length of the piston stroke also permits an overall simplification of the meter mechanism.

One of the objects of the present invention is to provide a piston meter having a simple and effective means for compensating for wear, maladjustment or manufacturing inequalities.

Another object is to provide a simple and effective mechanism for varying the displaceable volume of the cylinders of a piston meter.

A further object is to provide a simple compact piston meter having a minimum number of working parts.

A further object is to provide a novel piston meter having a simple and inexpensive valve arrangement for distributing fluid to the cylinders.

These and other objects and advantages reside in certain novel features of construction, arrangement and combination of parts, as will hereinafter be more fully described and pointed out in the annexed specification and claims.

Referring to the drawings:

Figure 1 is a vertical central section of my improved meter illustrating the piston and register drive structure and the valve at the bottom of the meter;

Figure 2 is a top plan view of the piston displacement indicator partly cut away to show details of construction; and Figure 3 is a section taken on line 3—3 of Figure 1 illustrating the valve and port arrangements.

The meter of the present invention is generally similar in structure, purpose and operation to the meter described and claimed in Parker et al. Patent No. 2,106,651, but embodies certain improvements thereover.

In the embodiment illustrated in the drawing, 10 indicates generally the meter casing which is preferably of cast metal and houses the operating parts of the meter. This casing 10 is formed with a plurality of cylinders 11 displaced radially about a common center. A piston indicated generally at 12 is slidably mounted in each cylinder 11, and the outer end of each cylinder 11 is closed by a cylinder head 13. Each cylinder head 13 is suitably secured to the casing 10 as, for example, by a snap ring 14, and a gasket 15 forms a fluid tight seal between the cylinder head 13 and the casing 10.

The fluid to be measured enters the meter through an opening 16 in a member 17 rigidly secured to the casing 10 by bolts 18. This member 17 forms a bottom cover fluid inlet chamber indicated at 19. Within the inlet chamber 19, a flat valve bearing plate 20 is suitably secured to the casing 10 as for example by pins 21. A gasket 22 prevents the leakage of fluid around the bearing plate 20.

The bearing plate 20 is formed with a plurality of identical inlet openings 23, one for each cylinder. These openings 23 are of arcuate shape and are arranged radially about a common center as shown in Figure 3. An outlet opening 24, concentric with the inlet openings 23 is also provided in the bearing plate 20.

The casing 10 is provided with a plurality of fluid conduits 25, one for each cylinder 11. Each conduit 25 extends from an inlet opening 23 to the outer end of a cylinder 11 to conduct fluid from the inlet chamber 19 to a piston 12.

Each of the pistons 12 is of the same construction so that only one need be described in detail. Each piston comprises a piston head 26 having a circumferential groove 27 within which a piston ring 28 is positioned. A flexible cup or washer 29 of leather, rubber or other suitable material is clamped to the piston head by an annular retainer 30 which is tightly secured to the piston head by screws 31. An expansible spring ring 32 suitably supported on retainer 30 presses the flexible cup or washer against the walls of the cylinder 11 to form a fluid-tight connection.

In the illustrated embodiment of my invention, there are two pairs of opposed pistons 12. The pistons of one pair are rigidly connected together by a Scotch yoke 33, which is rigidly secured to each piston 12 as by screws or bolts 31. The pistons of the other pair move at right angles to the pistons of the first pair and are rigidly secured together by a similar Scotch yoke 34.

The yoke 33 is provided with an elongated slot 35 extending transversely of the direction of movement of the pair of pistons which it connects, and this slot 33 is preferably faced with suitable bearing metal 36. The yoke 34 is provided with a similar slot 37 which extends transversely of the direction of movement of the pistons which it connects and is similarly faced with bearing metal 38.

A crank pin 39, rigidly secured to a crank arm 40, extends through the elongated slots 35 and 37 in the yokes 33 and 34 respectively, and is provided with bearing members 41 and 42 positioned by spacing rings or washers 43 for engagement with the surfaces of the slots 35 and 37 respectively. A spring ring 44 engages in an annular groove 45 in the crank pin 39 for holding the bearing members 41 and 42 and spacing rings or washers 43 in position.

The crank arm 40 is non-rotatably fixed to a vertical shaft 46 by a pin 47, and this shaft 46 is rotatably mounted in an eccentric bore 48 in an externally cylindrical register drive sleeve 49, but is held against downward longitudinal movement by a spring ring 50 which engages in an annular groove 51 in the shaft 46 above the upper edge of the sleeve 49. A groove 52 may be formed in the shaft 46 and a suitable gasket 53 placed in the groove 52 to prevent the leakage of fluid between the shaft 46 and sleeve 49.

The sleeve 49 is journalled on a vertical axis in bearings 54 and 55 in a hollow boss 56 in a cover plate 57. Bearings 54 and 55 are coaxial with sleeve 49. The cover plate 57 is secured to the casing 10 by a spring ring 58 and a gasket of washer 59 forms a fluid tight joint between the cover plate 57 and the casing 10.

An annular washer 60 of leather, rubber or the like surrounds the sleeve 49 within the boss 56. The lower end of the hollow boss 56 is closed by a bearing retainer 55' which is held in position by a spring ring 61. A coiled compression spring 62 surrounds the sleeve 49 within the boss 56 and reacts against retainer 55' to press a ring 63 against the washer 60 to form a fluid tight joint between the sleeve 49 and the bearing 54. A thrust washer 64 surrounds the lower end of the shaft 46 between the crank arm 40 and the sleeve 49 and bearing 55.

The upper end of the sleeve 49 has a cup-shaped extension 65 and a clamp disc 66 is non-rotatably mounted on shaft 46 within the cup-shaped head or extension 65. A slot 67 is formed in disc 66 for receiving a flat tongue 68 on the upper end of the shaft 46. The cup-shaped extension 65 is closed by a cover 69 having clamping engagement with disc 66 and which is held in position by screws 70. An index pin 71 on the disc 66 projects upward through an arcuate slot 72 in the cover 70 and cooperates with a suitable scale 73 on the disc 66 to indicate the throw of the crank 40. The register, not shown, is driven from a suitable connector 74 on the cover 69.

The crank 40, shaft 46 and sleeve 49 rotate as a unit on the axis of the sleeve 49 since the shaft and sleeve are clamped together, and the stroke movement of the pistons 12 is limited by the effective length of the crank arm 40. The axes of the shaft 46 and sleeve 49 are parallel but spaced from each other so that the shaft 46 is eccentric with respect to the bearings 54 and 55.

The effective length of the crank arm 40 may be changed by varying the distance between the crank pin 39 and the axis of rotation of the sleeve 49. In order to accomplish this change, the screws 70 are loosened, and the cover plate 69 lifted to release the clamp disc 66 until sleeve 49 and shaft 46 are capable of relative rotation, and the extension 65 is turned by hand. The resistance of the pistons 12 to movement holds the shaft 46 against rotation so that turning the extension 65 rotates only the sleeve 49 in bearings 54 and 55. Since the shaft 46 is eccentric relative to bearings 54 and 55, such rotation of sleeve 49 displaces shaft 46 and the crank arm 40 carried thereby with respect to the axis of rotation of the sleeve 49.

The tongue 68 and slot 67 prevent relative rotation between the shaft 46 and clamp disc 66, and the amount of relative rotation between shaft 46 and sleeve 49 is shown by the index 71 and scale 73 which may be calibrated in terms of the effective length of crank arm 40. The amount of relative rotation of the shaft 46 and sleeve 49 determines the amount that the shaft 46 is displaced with respect to the axis of rotation of the sleeve 49.

After the adjustment has been made, screws 70 are tightened clamping the disc 66 between the cover 69 and the extension 65 and preventing further relative rotation between the shaft 46 and sleeve 49. The crank arm 40, shaft 46, sleeve 49 and connector 74 are then locked together to rotate as a unit on the vertical axis of rotation of the sleeve 49.

The lower end of the crank pin 39 projects into a radial slot 75 in a crank arm 76 fixed on a shaft 77 by a pin 78. The shaft 77 is journalled in a bearing sleeve 79 which is held in the outlet opening 24 by ribs 80. The shaft 77 is substantially coaxial with the sleeve 49 and the slot 75 permits movement of the crank pin 39 toward and from the axis of shaft 77 and sleeve 49 during the above described adjustment without disengaging the crank arm 76.

A tongue 81 in the lower end of the shaft 77 non-rotatably engages a groove 82 in a spindle 83 and a valve member 84 is fixed to this spindle 83 by a nut 85. A sleeve 86 is mounted in the inlet chamber 19 below the spindle 83 and valve member 84 on webs 87.

The lower end of the spindle 83 rests on a ball 88 which in turn is supported by a plunger 89 slidable in the sleeve 86. A coil spring 90 presses upward against the plunger 89 and ball 88 and urges the valve member 84 upward into contact with the flat bearing plate 20.

As shown in Figures 1 and 3, the valve member 84 is a hollow, cup-shaped element shaped to cooperate with the inlet ports 23 and outlet port 24. The valve member 84 is of such size and shape as to extend over the outlet port 24 and one inlet port 23. At the bearing plate 20, valve member 84 is provided on each side with an outwardly extending flange 91, each flange being of such size as to cover one inlet port 23, and between the flanges 91 there is a space equal to the size of one inlet port 23 opening into the inlet chamber 19. This space is directly opposite the inlet port 23 which opens into the valve member 84.

When the meter is in the position shown in Figure 1, the fluid to be measured flows under pressure into the inlet chamber 19, through the right hand inlet port 23 and conduit 25, and moves the right hand piston 12 to the left. Because of connecting rod 33, movement of the right hand piston 12 moves the left hand piston 12 to the left and forces fluid through the left hand conduit 25 and inlet port 23, into the valve member 84 and into the outlet port 24. The fluid passes through the outlet port 24 into passages in the interior of the meter and is withdrawn through a suitable outlet opening 92 near the top of the casing 10 similar to that in the Parker et al. patent.

The valve member 84 is rotated to distribute fluid to the pistons 12 and withdraw it in proper sequence by the shaft 77 through the tongue 81 and groove 82. The shaft 77 is in turn driven by the pistons 12 through the Scotch yokes 33 and 34, the crank pin 39 and the crank arm 76. In general the operation of the pistons by the fluid and the action of the valve is the same as in said Parker et al. patent to which attention is directed for further detail, the novelty here being in the meter structure.

The proper operation of the meter depends upon the angular movement of the valve member 84 by the pistons 12 and this angular movement is not affected by variations in the effective length of the crank arm 40. Thus the adjustment of the effective length of the crank arm 40 with the resulting change of the stroke of the pistons 12 does not change or affect the operation of the meter mechanism.

The above described meter is peculiarly useful for measuring volumes of a fluid such as crude oil, but is capable of general application.

From the foregoing it will be apparent that I am able to attain the objects of my invention and provide a simple, compact, efficient fluid meter having a simple, effective mechanism for adjusting the length of the piston stroke.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter having a casing provided with a plurality of cylinders each containing a piston operably connected with a crank pin, means for varying the travel of said pistons comprising a sleeve having an eccentric bore, said sleeve being journalled in said casing and projecting through the wall of said casing, a shaft journalled in said bore, a crank arm connecting said shaft and said pin, register drive means arranged coaxially with said sleeve, motion transmitting means positioned between said register drive means and said sleeve and drivingly connected to said shaft, and means connected to said register drive means for selectively frictionally clamping and releasing said motion transmitting means between said register drive means and said sleeve whereby said sleeve may be selectively rotated with respect to said shaft and thereby vary the effective travel of said piston.

2. A fluid meter as defined in claim 1 together with coacting means on said register drive means and motion transmitting means for indicating the relative position of said shaft and said sleeve.

3. In a piston type fluid meter, a casing, a register drive sleeve journalled in said casing, said sleeve having an eccentric bore and a relatively large diameter cup shaped head at one end externally of the casing, a shaft in the sleeve bore, a piston driven crank arm fixed to the inner end of said shaft, said sleeve being selectively rotatable relative to the shaft to change the effective length of the crank arm, a member drivingly connected to said shaft mounted in said sleeve head to releasably couple said sleeve and shaft for unitary rotation, and a cover plate detachably secured to the sleeve head extending over said member to releasably retain said member in driving relation with said sleeve head, said cover plate having means for driving connection with a register drive shaft.

4. In a fluid meter, a casing having opposed radial cylinders with pistons reciprocating therein and a common fluid outlet chamber, valve drive means including a shaft operably connected with said pistons and rotatable about an axis normal to the axes of said cylinders, a valve seat plate fixed to said casing having ports in register with inlet passages leading to said cylinders and having an additional port concentric with said shaft in fluid communication with said outlet chamber, a fluid inlet connection detachably secured to said casing and providing a fluid inlet substantially coaxial with the axis of said shaft, a rotary valve member mounted therein and constructed to control fluid flow through said ports, coacting coupling parts on said shaft and said valve member, said coupling parts being angularly adjustable with respect to said valve member, means providing an internal sleeve in said inlet connection substantially coaxial with the axis of said shaft, and means in said inlet connection to yieldingly urge said valve member into contact with said valve seat plate and to maintain an effective coupled relation between said coupling parts comprising a spring pressed plunger mounted in said sleeve and a single thrust bearing ball interposed between said plunger and the valve member at said axis of said shaft.

GEORGE E. BATCHELDER.

REFERENCES CITED

The following references are of record in the file of this patent:

UNITED STATES PATENTS

| Number | Name | Date |
|---|---|---|
| 1,270,002 | Bowser | June 18, 1918 |
| 1,893,595 | Perkins et al. | Jan. 10, 1933 |
| 1,912,687 | Brouse | June 6, 1933 |
| 1,985,399 | Blum | Dec. 25, 1934 |
| 2,208,950 | Risser | July 23, 1940 |
| 2,356,273 | Risser | Aug. 22, 1944 |

FOREIGN PATENTS

| Number | Country | Date |
|---|---|---|
| 393,916 | Great Britain | June 15, 1933 |
| 446,199 | Great Britain | Apr. 27, 1936 |
| 467,120 | Great Britain | June 11, 1937 |